United States Patent
Smith

(10) Patent No.: US 7,437,082 B1
(45) Date of Patent: Oct. 14, 2008

(54) PRIVATE OPTICAL COMMUNICATIONS SYSTEMS, DEVICES, AND METHODS

(75) Inventor: David F. Smith, Ellicott City, MD (US)

(73) Assignee: Broadwing Corporation, Austin, TX (US)

( * ) Notice: Subject to any disclaimer, the term of this patent is extended or adjusted under 35 U.S.C. 154(b) by 799 days.

(21) Appl. No.: 10/618,996

(22) Filed: Jul. 14, 2003

Related U.S. Application Data

(60) Provisional application No. 60/395,605, filed on Jul. 12, 2002.

(51) Int. Cl.
*H04B 10/00* (2006.01)
*H04B 10/02* (2006.01)

(52) U.S. Cl. .................. 398/175; 398/161; 398/154

(58) Field of Classification Search ............ 398/39, 398/40, 46, 47, 51, 53, 54, 74, 75, 76, 140, 398/150, 154, 160, 161, 192, 193
See application file for complete search history.

(56) References Cited

U.S. PATENT DOCUMENTS

| | | | |
|---|---|---|---|
| 5,572,350 A * | 11/1996 | Spanke | 398/54 |
| 6,118,566 A | 9/2000 | Price | |
| 6,344,922 B1 | 2/2002 | Grubb et al. | |
| 6,407,843 B1 * | 6/2002 | Rowan et al. | 398/202 |
| 6,433,904 B1 * | 8/2002 | Swanson et al. | 398/91 |
| 6,449,073 B1 | 9/2002 | Huber | |
| 6,654,562 B1 * | 11/2003 | Murata | 398/79 |
| 6,731,877 B1 * | 5/2004 | Cao | 398/91 |
| 7,149,432 B1 * | 12/2006 | Smith et al. | 398/158 |
| 2002/0105703 A1 | 8/2002 | Grubb et al. | |
| 2003/0058504 A1 * | 3/2003 | Cho et al. | 359/161 |

FOREIGN PATENT DOCUMENTS

WO    WO 01/54425    7/2001

* cited by examiner

*Primary Examiner*—Dalzid Singh
(74) *Attorney, Agent, or Firm*—Thorp Reed & Armstrong, LLP

(57) ABSTRACT

A method for transmitting traffic in an optical communication system comprising separating the input traffic into a plurality of data signals, parameter encoding the data signals, transmitting each of the data signals on a separate optical channel, receiving the data signals on the channels, parameter decoding the data signals, and combining the plurality of data signals from the channels into output traffic corresponding to the input traffic.

13 Claims, 8 Drawing Sheets

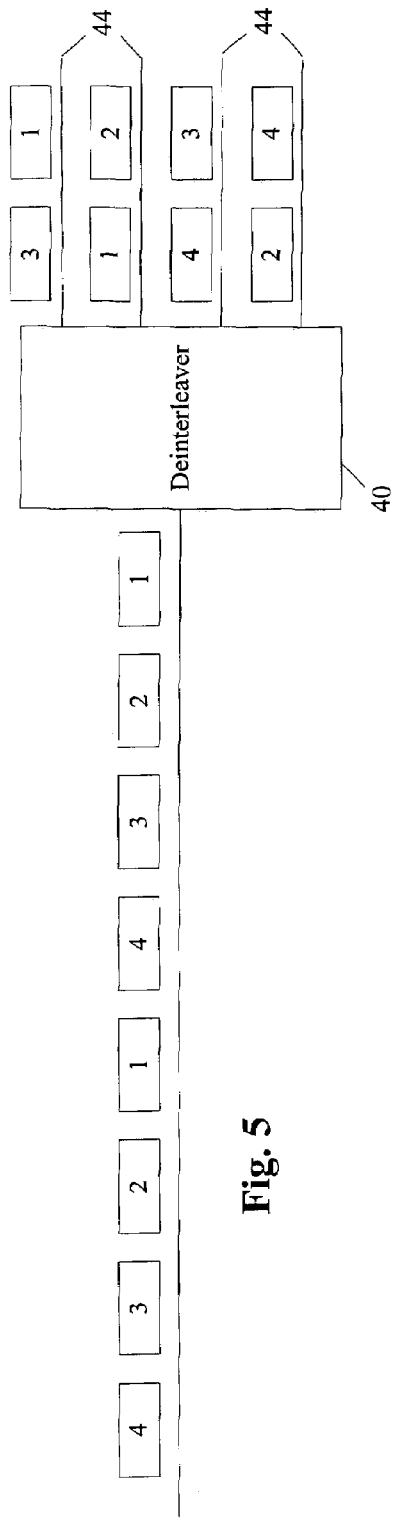
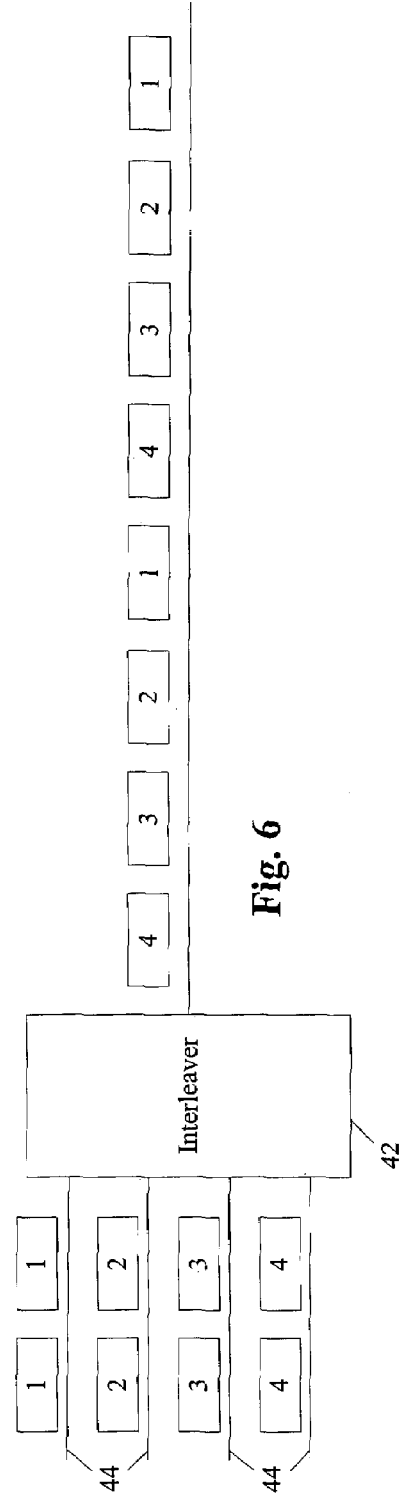
Fig. 5
Fig. 6

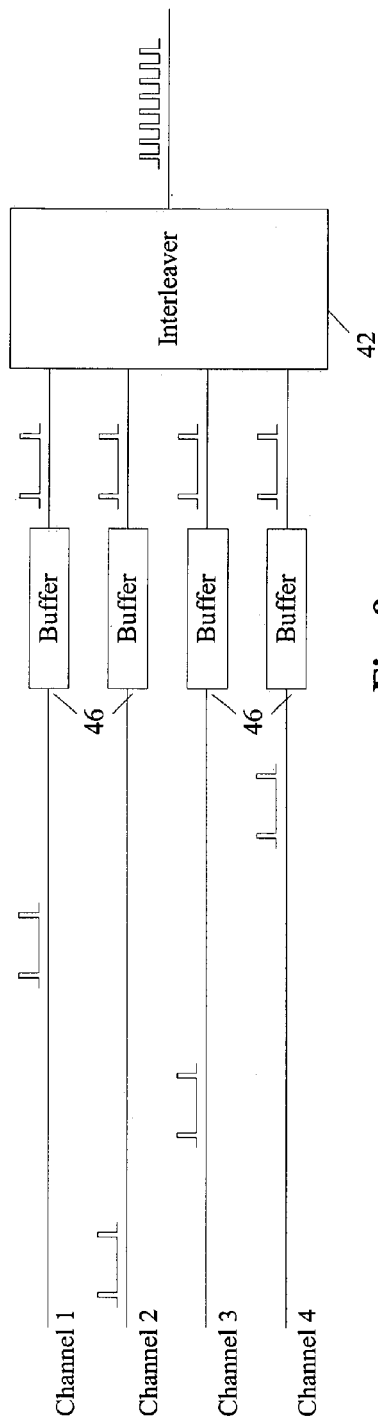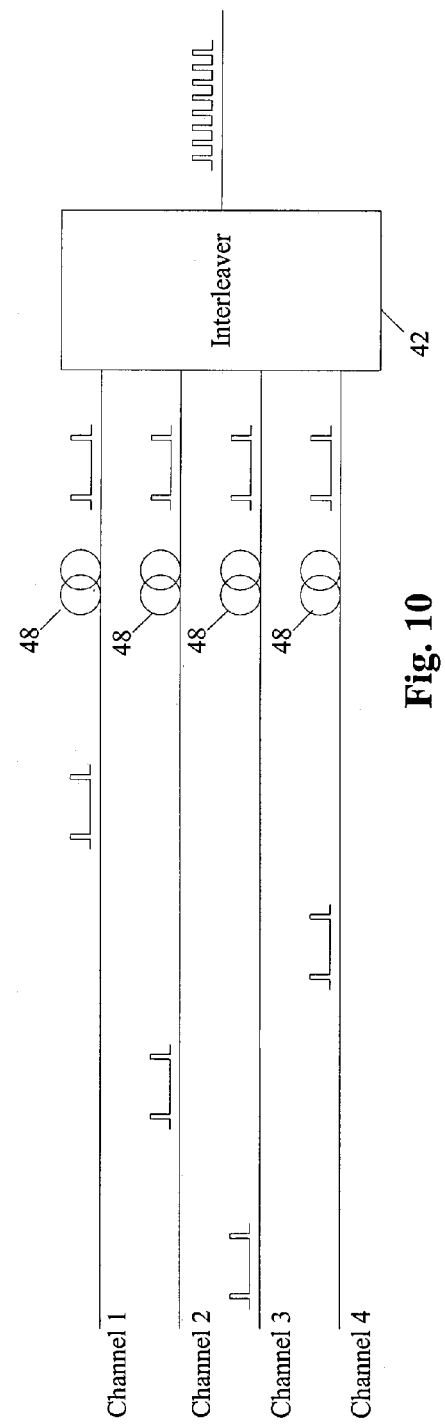

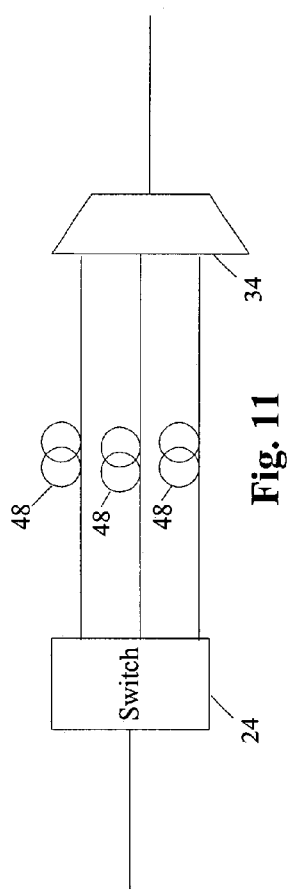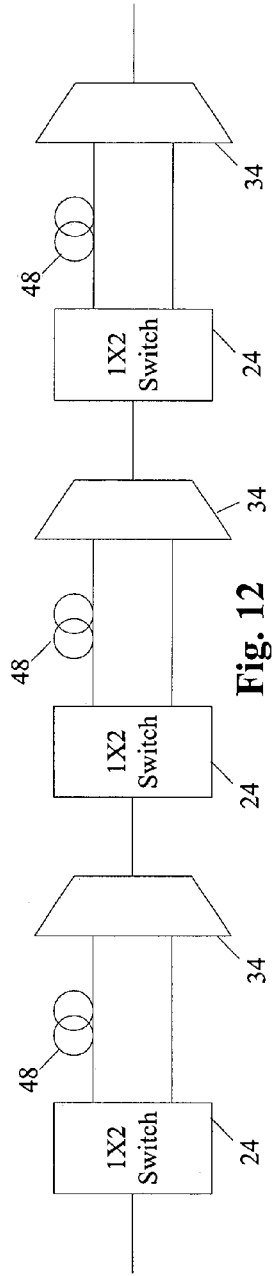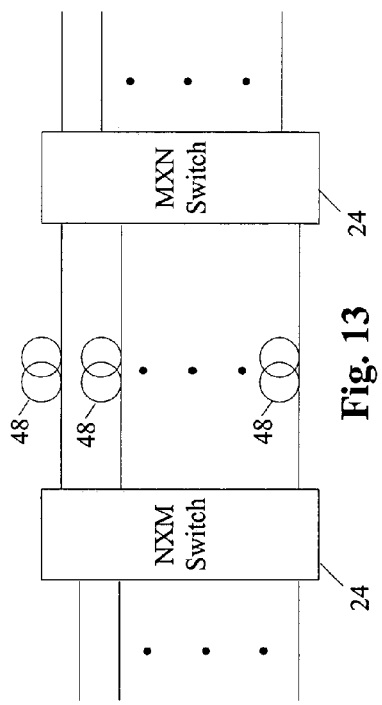

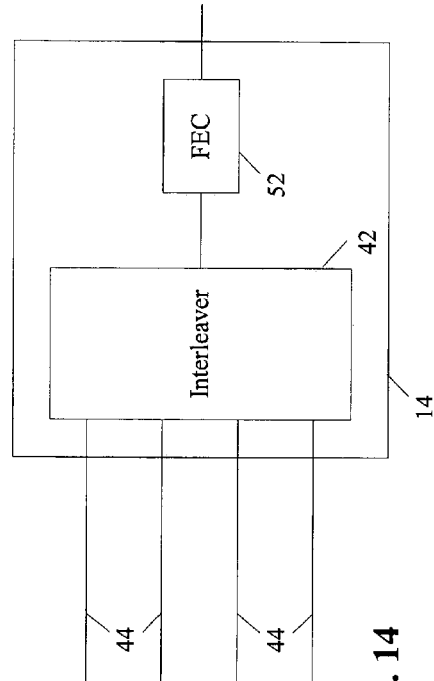
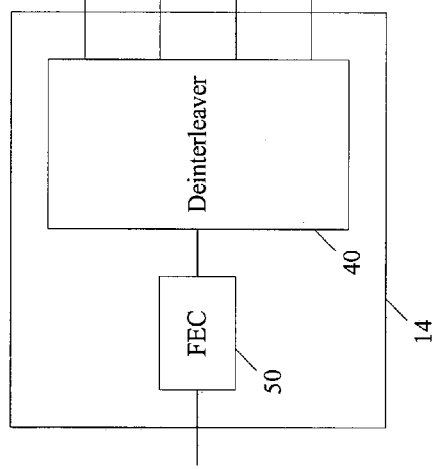
Fig. 14
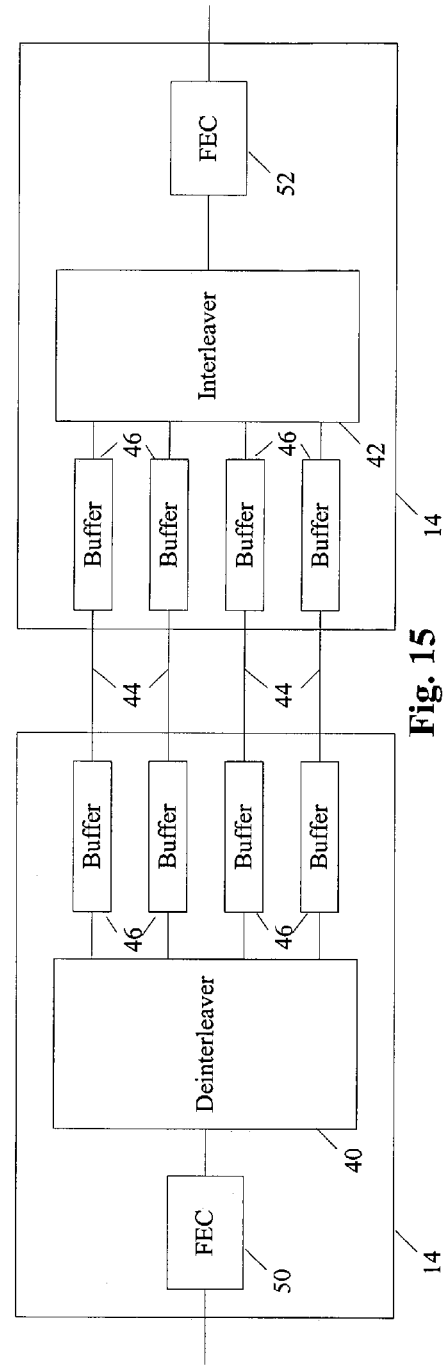
Fig. 15

US 7,437,082 B1

PRIVATE OPTICAL COMMUNICATIONS SYSTEMS, DEVICES, AND METHODS

CROSS-REFERENCE TO RELATED APPLICATIONS

This application claims priority from U.S. Provisional Patent Application No. 60/395,605, filed Jul. 12, 2002.

STATEMENT REGARDING FEDERALLY SPONSORED RESEARCH OR DEVELOPMENT

Not Applicable.

BACKGROUND OF THE INVENTION

The present invention is directed generally to the transmission of signals in optical communications systems. More particularly, the invention relates to systems, devices, and methods for privately transmitting information on optical signals.

The development of digital technology provided the ability to store and process vast amounts of information. While this development greatly increased information processing capabilities, it was soon recognized that in order to make effective use of information resources it was necessary to interconnect and allow communication between information resources. Efficient access to information resources requires the continued development of information transmission systems to facilitate the sharing of information between resources. One effort to achieve higher transmission capacities has focused on the development of optical transmission systems. Optical transmission systems can provide high capacity, low cost, low error rate transmission of information over long distances.

The transmission of information over optical systems is typically performed by imparting the information in some manner onto an optical signal. In most optical transmission systems the information is imparted by using an electrical data stream either to directly modulate an optical source or to externally modulate an optical carrier so that the information is carried at the frequency of the optical carrier, or to modulate the information onto one or more subcarriers or sidebands, with the later technique sometimes called sub-carrier modulation ("SCM").

Initially, modulated optical signals were spatially separated by placing each optical signal on a different fiber to provide space division multiplexing ("SDM") of the information in optical systems. As the demand for capacity grew, increasing numbers of information data streams were spaced in time, or time division multiplexed ("TDM"), on the single optical signal in the SDM system as a means to better use the available bandwidth. The continued growth in demand has spawned the use of wavelength division multiplexing ("WDM") to transport multiple optical signals on a single fiber. In WDM systems, further increases in transmission capacity can be achieved not only by increasing the transmission rate of the information on each wavelength, but also by increasing the number of wavelengths, or channels, in the system.

With the increase in data transmission capacities, users, including individuals, businesses, and governments, now utilize applications that require the transmission of private information. Because of the sensitive nature of this information, it is desirable to communicate this private information in a manner to reduce the probability that an eavesdropper will be able to intercept the private information. Also, because optical networks often pass through remote areas, an eavesdropper may gain physical access to an optical fiber or node in the network that allows the eavesdropper to intercept the data carried in the network. For example, amplifier hut sites are typically remote and secluded and are easily penetrated with little risk of discovery. For maintenance and diagnostic purposes, every amplifier has diagnostic optical access ports and connectors that would allow an intruder to extract and/or modify optical signals. Malicious disruption of the traffic is a lower risk since it can be handled by network protection, and would produce serious risk of detection, but eavesdropping and small scale tampering with the data is possible. The private transmission of data may be achieved at various levels, including authentication, data encryption, and transport.

Authentication involves the use of techniques to only allow properly authorized individuals to gain access to and control of a network. This may be done using software and/or by controlling physical access to the network. A software authentication solution may be accessed through a public network and compromised.

Data encryption uses cryptographic encryption techniques that are difficult to decrypt to protect data transmitted in the network. While data encryption is a very powerful at protecting the privacy of information in an optical network, today there are no commercial bulk encrypters/decrypters that are able to encrypt/decrypt data at the high data rates carried on optical networks, e.g., 10 Gb/s or higher.

Transport privacy protection involves preventing an unauthorized eavesdropper from being able to easily collect the data on the network. Transport privacy protection may be used decrease the probability of intercepting the data by an eavesdropper, thereby increasing the privacy of the network. Transport privacy protection may be used alone or with authentication and/or data encryption to increase the privacy of data transmitted in networks. Therefore, there remains a need to provide transport privacy protection to increase the privacy of data transmitted in networks.

BRIEF SUMMARY OF THE INVENTION

The systems, devices, and methods of the present invention address the above-stated need for higher capacity, private optical communications systems, devices, and methods. The present invention deinterleaves an input data stream into several lower data rate data signals. The deinterleaving may take portions of the input stream and reorder them as they a transmitted along separate channels. Buffers may be used to delay individually each of the separated data signals on each channel. The input data stream may be FEC encoded prior to deinterleaving. Also, the channels carrying an input stream may take different optical paths through the network. Each of the above techniques, reordering, delaying, FEC encoding, and using different optical paths, may be varied periodically either randomly or in a known pattern. Any combination of these techniques may be used in an optical network according to the present invention.

One embodiment of the present invention is a method for transmitting traffic in an optical communication system comprising separating the input traffic into a plurality of data signals, parameter encoding the data signals, transmitting each of the data signals on a separate optical channel, receiving the data signals on the channels, parameter decoding the data signals, and combining the plurality of data signals from the channels into output traffic corresponding to the input traffic.

Another embodiment of the present invention is a method for transmitting traffic in an optical communication system comprising deinterleaving input traffic into a plurality of data signals, transmitting each of the data streams on a separate channel, inserting a known time shift between at least two of the data signals, receiving the data signals, compensating for the time shift between the data signals, and interleaving the data signals from the channels into output traffic corresponding to the input traffic.

Another embodiment of the present invention is a method for transmitting traffic in an optical communication system comprising separating the input traffic into a plurality of portions, separating the input traffic into an additional plurality of portions, assigning the plurality portions in a first order to a plurality of data signals, assigning the plurality of additional portions in a second order to the plurality of data signals, transmitting each of the data signals on a separate channel, receiving the data signals on the channels, combining the plurality of portions into output traffic corresponding to the input traffic, and combining the plurality of additional portions into output traffic corresponding to the input traffic.

Those and other embodiments of the present invention will be described in the following detailed description, including other methods, apparatuses, and systems according to the present invention. The present invention addresses the needs described above in the description of the background of the invention by providing improved systems, apparatuses, and methods. These advantages and others will become apparent from the following detailed description.

BRIEF DESCRIPTION OF THE DRAWINGS

Embodiments of the present invention will now be described, by way of example only, with reference to the accompanying drawings, wherein:

FIG. 5 illustrates another embodiment of the deinterleaver;

FIG. 6 illustrates the operation of an interleaver according to the present invention;

FIG. 9 illustrates an interleaver and buffers for use with signals that are delayed;

FIG. 10 illustrates an interleaver with fiber coils for delaying the optical signals on channels;

FIGS. 11-13 illustrate various embodiments of apparatuses for varying the delay of an optical signal;

FIG. 14 illustrates another embodiment of the current invention; and

FIG. 15 illustrates another embodiment of the present invention.

DETAILED DESCRIPTION OF THE INVENTION

Figure 1:
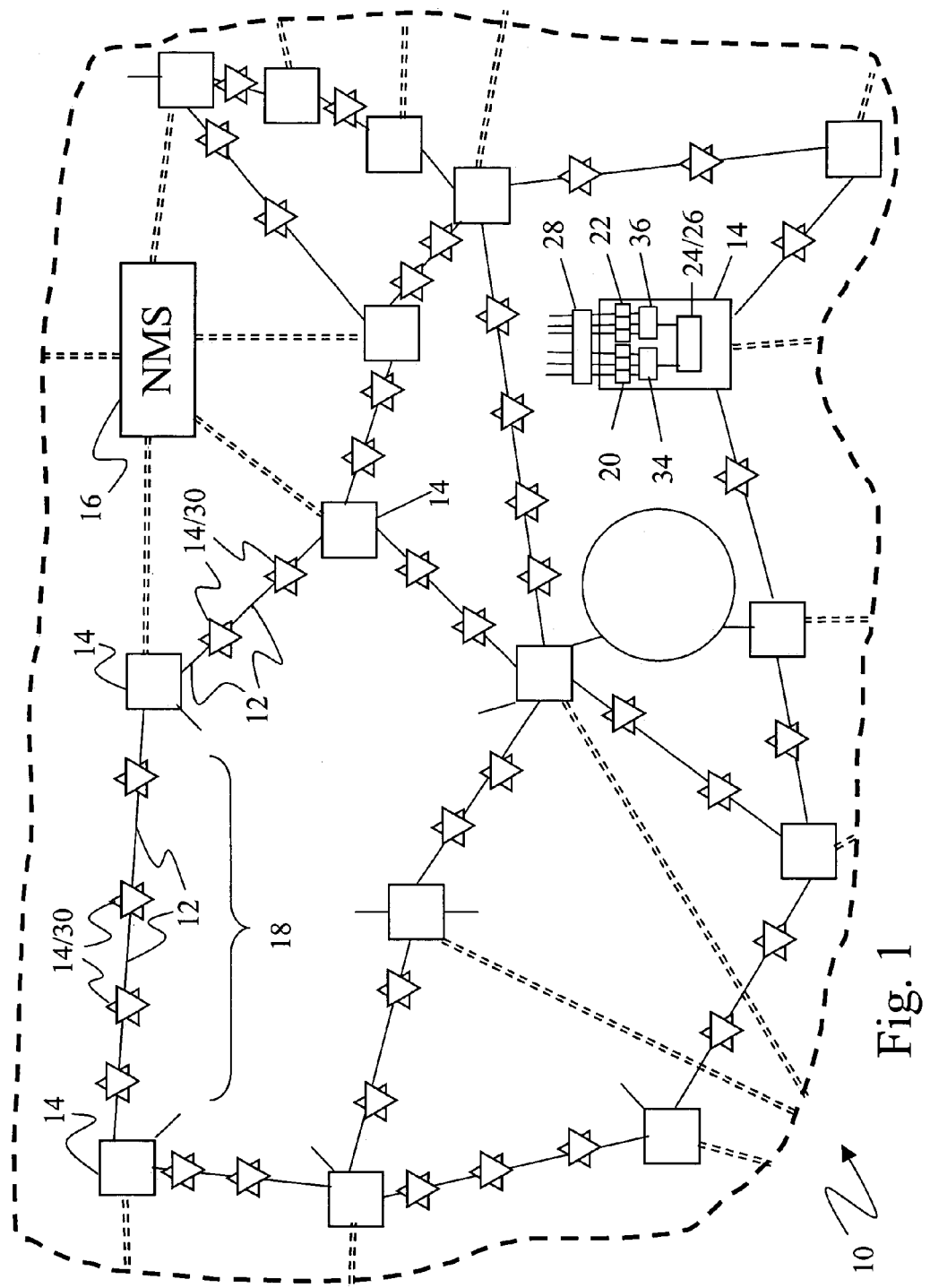
FIGS. 1 and 2 illustrate examples optical communications systems.

FIG. 1 illustrates an optical communications system 10 which includes optical paths 12 connecting nodes and network elements 14. Advantages of the present invention can be realized with many system 10 configurations and architectures, such as an all optical network, one or more point to point links, one or more rings, a mesh, other architectures, or combinations of architectures. The system 10 illustrated in FIG. 1 is a multi-dimensional network, which can be implemented, for example, as an all optical mesh network, as a collection of point to point links, or as a combination of architectures. The system 10 can employ various signal formats, and can also convert between formats. The system 10 can also include more or less features than those illustrated herein, such as by including or deleting a network management system ("NMS") 16 and changing the number, location, content, configuration, and connection of nodes 14.

The optical paths 12 can include guided and unguided transmission media, such as one or more optical fibers, ribbon fibers, planar devices, and free space devices, and can interconnect the nodes 14 providing optical communication paths through the system 10. Various types of transmission media can be used, such as dispersion shifted fiber ("DSF"), non-dispersion shifted fiber ("NDSF"), non-zero dispersion shifted fiber ("NZDSF"), dispersion compensating fiber ("DCF"), polarization maintaining fiber ("PMF"), single mode fiber ("SMF"), multimode fiber ("MMF"), other types of transmission media, and combinations of transmission media. Furthermore, the transmission media can be doped, such as with erbium, germanium, neodymium, praseodymium, ytterbium, other rare earth elements, other dopants, and mixtures thereof. The paths 12 can carry one or more uni- or bi-directionally propagating optical signal channels or wavelengths. The optical signal channels can be treated individually or as a single group, or they can be organized into two or more wavebands or spectral groups, each containing one or more optical signal channel.

One or more paths 12 can be provided between nodes 14 and can be connected to protection switching devices and/or other redundancy systems. The optical path 12 between adjacent nodes 14 is typically referred to as a link 18, and the optical path 12 between adjacent components along a link 18 is typically referred to as a span.

The nodes and network elements 14 can include one or more signal processing devices including one or more of various optical and/or electrical components. The nodes 14 can perform network functions or processes, such as switching, routing, amplifying, multiplexing, combining, demultiplexing, distributing, or otherwise processing optical signals. For example, nodes 14 can include one or more transmitters 20, receivers 22, switches 24, add/drop multiplexers 26, amplifiers 30, interfacial devices 28, multiplexers/combiners 34, and demultiplexers/distributors 36, as well as filters, dispersion compensating and shifting devices, monitors, couplers, splitters, and other devices. One embodiment of one node 14 is illustrated in FIG. 1, although the nodes 14 can have many other variations and embodiments. Additional examples of nodes 14 are described in U.S. patent application Ser. No. 09/817,478, filed Mar. 26, 2001 and U.S. Pat. No. 6,344,922 issued Feb. 5, 2002, 1999, both of which are incorporated herein by reference.

The NMS 16 can manage, configure, and control nodes 14 and can include multiple management layers that can be directly and indirectly connected to the nodes 14. The NMS 16 can be directly connected to some nodes 14 via a data communication network (shown in broken lines) and indirectly connected to other nodes 14 via a combination of a directly connected node and communications paths in the optical system 10. The data communication network can, for example, be a dedicated network, a shared network, or a combination thereof. A data communications network utilizing a shared network can include, for example, dial-up connections to the nodes 14 through a public telephone system. The NMS 16 can reside at one or more centralized locations and/or can be distributed among components in the system 10. Mixed data or supervisory channels can be used to provide connections between the network elements of the NMS 16, which can be located in nodes 14 or remote from nodes 14. The supervisory channels can be transmitted within and/or outside the signal wavelength band and on the same medium or a different medium than the wavelength band. Examples of an NMS 16 are described in U.S. Patent Application Ser. No. 60/177,625, filed Jan. 24, 2000, and PCT Patent Application PCT/US01/02320, filed Jan. 24, 2001, both of which are incorporated herein by reference.

The transmitters 20 and receivers 22 are configured respectively to transmit and receive optical signals including one or more information carrying optical signal wavelengths, or channels, via the optical paths 12. The transmitters 20 and receivers 22 can be used in multiple and single channel systems, and can provide varying reach (e.g., short, intermediate, and long reach). The transmitters 20 and receivers 22 can also be part of a device that includes standardized interface transmitters and receivers, such as to support interoperability with other devices and systems, which is particularly useful in WDM applications.

The transmitters 20 include an optical source that provides an optical carrier and can utilize, for example, coherent or incoherent sources, and narrow band or broad band sources, such as distributed feedback ("DFB") sources, distributed Bragg reflection ("DBR") sources, sliced spectrum sources, fiber lasers, semiconductor lasers, light emitting diodes, and other optical sources. The transmitters 20 often include a narrow bandwidth laser as the optical source. The transmitter 20 can impart information onto the optical carrier or onto one or more subcarriers or sidebands. Typically, information is imparted by directly modulating the optical source, by externally modulating the optical carrier, or by modulating the information onto one or more subcarriers or sidebands of the optical carrier, with the later sometimes called sub-carrier modulation ("SCM"). The transmitter 20 may utilize one or more types of modulators, such as electro-optic (e.g., lithium niobate), electro-absorptive, etc.

The receiver 22 can include various detection techniques, such as coherent detection, optical filtering and direct detection, as well as other techniques and combinations thereof. The receiver 22 can include filters, such as fiber Bragg grating filters, bulk grating filters, or other types of filters, or filtering can be performed outside of the receiver 22.

The transmitters 20 and receivers 22 can utilize one or more formats to transmit and receive optical signals. For example, modulation formats such as amplitude modulation, frequency modulation, phase modulation, polarization modulation, power modulation, other modulation formats and combinations of formats, such as quadrature amplitude modulation, can be used. Also, return to zero ("RZ") or non-return to zero ("NRZ") formats can be used with various modulation techniques. Different encoding formats can also be used, such as differential encoding, duobinary encoding, other encoding formats, and combinations thereof. One or more multiplexing formats can be employed, such as space, time, code, frequency, phase, polarization, wavelength, other types, and combinations thereof. The format can also include one or more protocols, such as SONET/SDH, IP, ATM, Digital Wrapper, GMPLS, Fiber Channel, Ethernet, etc. Other signal formats, such as soliton, pulse, chirp, etc, can also be used. Transmitters 20 and receivers 22 can utilize the same format for all channels throughout the system 10, or different formats can be used for different channels and/or in different parts of the system 10, with appropriate format conversion being performed by the transmitters 20 and receivers 22 or by other devices. Examples of optical transmitters 20 are described in U.S. Pat. No. 6,118,566, issued Sep. 12, 2000, which is incorporated herein by reference.

Tunable transmitters 20 and receivers 22 can be used, such as to provide flexibility in the selection of wavelengths used in the system 10. The transmitters 20 and receivers 22 can also include or be associated with other components to perform other signal processing, such as reshaping, retiming, error correction, protocol processing, pre-emphasis, and optical and/or electrical pre- and post-dispersion and distortion compensation. For example, receivers 22 can be connected to the transmitters 20 in back to back configuration as a transponder or regenerator. The regenerator can be deployed as a 1R, 2R, or 3R regenerator, depending upon whether it serves as a repeater (R1: repeat), a remodulator (R2: reshape & repeat), or a full regenerator (R3: reshape, retime, repeat), respectively. The transmitters 20 and receivers 22 in a WDM system can be operated in a uniform manner or the transmission and reception characteristics of the signal channels can be tailored individually and/or in groups.

The switches 24 can take many forms and can have different levels of "granularity". "Granularity" refers to the resolution or precision with which the switching is performed. For example, WDM switches 24 can switch individual wavelengths (also called "channels"), groups of wavelengths, or portions of wavelengths. Before being switched, the signals can be demultiplexed into the appropriate level of granularity, and after being switched the signals can be multiplexed into the desired format, using the same or different modulation formats, wavelengths, or other characteristics.

Switches 24 can have electrical, optical, or electrical/optical switch "fabrics". The switch "fabric" refers to the technology used to perform the switching. Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use micro-electromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in an optically transparent liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. patent application Ser. No. 09/119,562, filed Jul. 21, 1998, which is incorporated herein by reference.

Switches 24 can be grouped into two categories: integrated switches and interfacial switches. Integrated switches allow for optical continuity of signals, while interfacial switches introduce an optical discontinuity which interrupts optical signals with one or more O-E-O conversion, either in the switch itself or in a related component such as a multiplexer 34, demultiplexer 36, or other interface device. In contrast, integrated switches are optically integrated into the system 10 and allow optical signals to continue through the system 10, via the integrated switch 24, without an O-E-O conversion or optical discontinuity. Integrated switches 24 are sometimes called "all-optical switches", "O-O" switches, or "O-O-O" switches. Interfacial switches 24 are a type of interfacial device 28, which is discussed in more detail hereinbelow. Interfacial switches are located within or at the periphery of networks 10 and point to point links 18, such as between two or more point to point links 18, between two or more networks 10, or between a network 10 and a point to point link 18. A switch 24 can have both an integrated switch 24 portion and an interfacial switch 24 portion, such that some signals are switched without an O-E-O conversion, while other signals are subjected to an O-E-O conversion. Switches 24 can have many forms and variations. For example, in addition to being integrated or dedicated, and having an optical and/or electrical switch fabric, a switch 24 can be polarization-sensitive or polarization-insensitive.

Add/drop multiplexers 26 and other devices can function in a manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10 (e.g., systems 10 having integrated switches 24 and integrated add/drop multiplexers 26) are not converted into electrical form until they reach their destination, or until the signals degrade to the point they need to be regenerated before further transmission. Of course, add/drop multiplexers 26 can also be interfacial devices 28.

Interfacial devices 28 generally act as interfaces to and between optical networks 10 and/or point to point links 18. Interfacial devices 28 typically perform at least one optical-to-electrical ("O-E") or electrical-to-optical ("E-O") conversion. In the case of an interfacial switch 24, for example, signals are subjected to an O-E-O conversion before proceeding to the next link 18 or network 10. Interfacial devices 28 can, for example, act as an interface between electrical and optical systems or devices, between different formats, or at other interfaces. Interfacial device 28 can be located within or at the periphery of networks 10, such as between two or more networks 10, between two or more point to point links 18, and between networks 10 and point to point links 18. Interfacial devices 28 can include, for example, cross-connect switches, IP routers, ATM switches, etc., and can have electrical, optical, or a combination of switch fabrics. Interfacial devices 28 can provide interface flexibility and can be configured to receive, convert, and provide information in one or more various formats, protocols, encoding schemes, and bit rates to the transmitters 20, receivers 22, and other devices. The interfacial devices 28 also can be used to provide other functions, such as protection switching.

The optical amplifiers 30 can be used to provide signal gain, such as to overcome attenuation, and can be deployed proximate to other optical components, such as in nodes 14, as well as along the optical communications paths 12. The optical amplifiers 30 can include concentrated/lumped amplification and/or distributed amplification, and can include one or more stages. The optical amplifier can include, for example, doped (e.g. erbium, neodymium, praseodymium, ytterbium, other rare earth elements, other dopants, and mixtures thereof) and/or non-linear interaction amplifiers (e.g., Raman amplifiers, Brillouin amplifiers, etc.), and can be locally and/or remotely pumped with optical energy. The optical amplifiers 30 can also include other types of amplifiers 30, such as semiconductor amplifiers. Two or more amplifiers 30 may be co-located and concatenated to provide additional flexibility.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more serial or parallel stages incorporating various multi-port device and filter combinations to multiplex, demultiplex, and/or broadcast signal wavelengths $\lambda_i$ in the optical systems 10.

Figure 2:
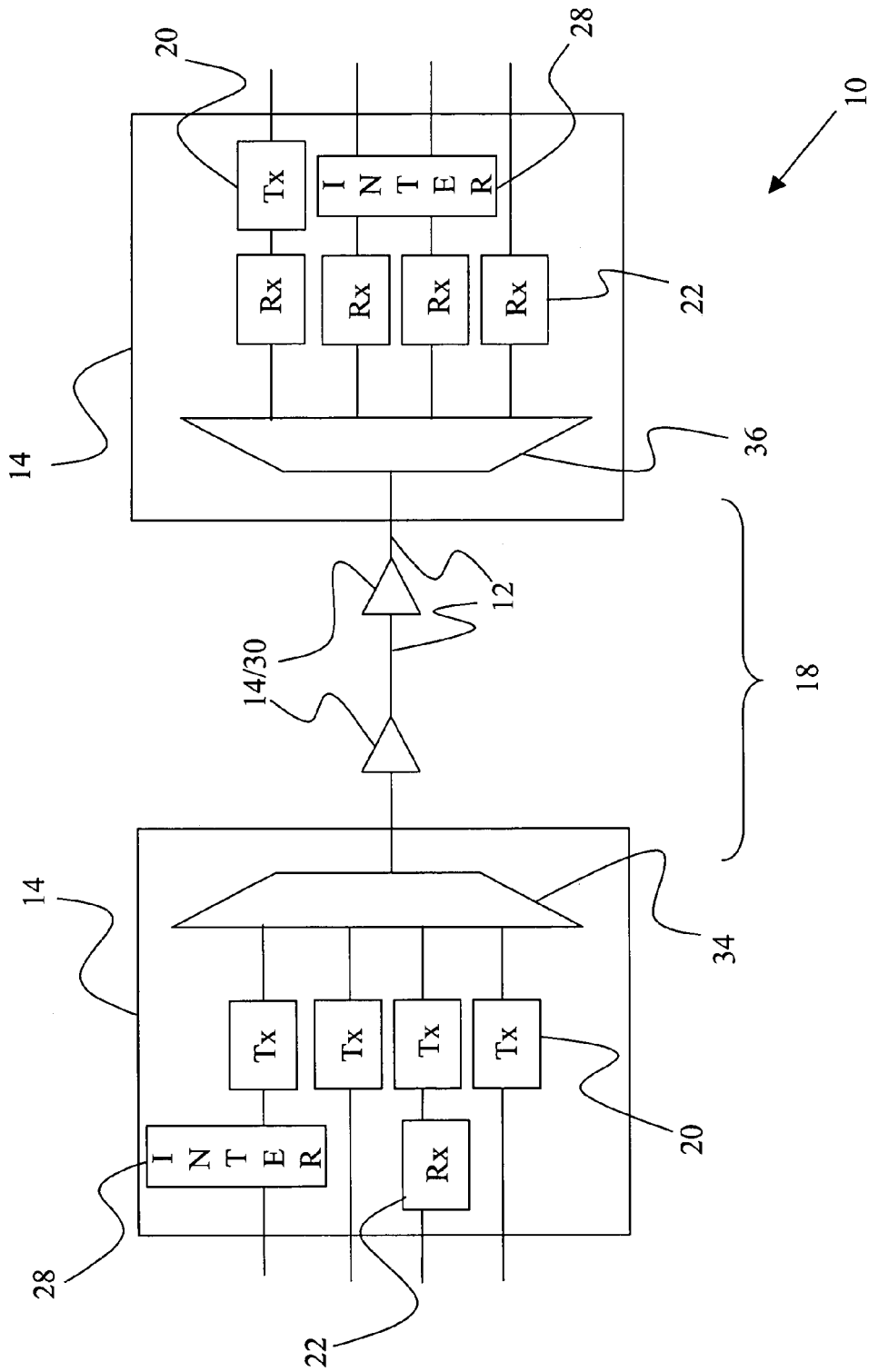

FIG. 2 illustrates another embodiment of the system 10 including a link 18 of four nodes and network elements 14. That link 18 can be, for example, all or part of a point to point system, or it may be part of a multi-dimensional, mesh, or other system. One or more of the nodes or network elements 14 can be connected directly to the network management system 16 (not shown). If the link 18 is part of a larger system, then as few as none of the nodes or network elements 14 can be connected to the network management system 16 and all of the nodes and network elements 14 can still be indirectly connected to the NMS 16 via another node or network element 14 in the larger system 10.

Figure 3:
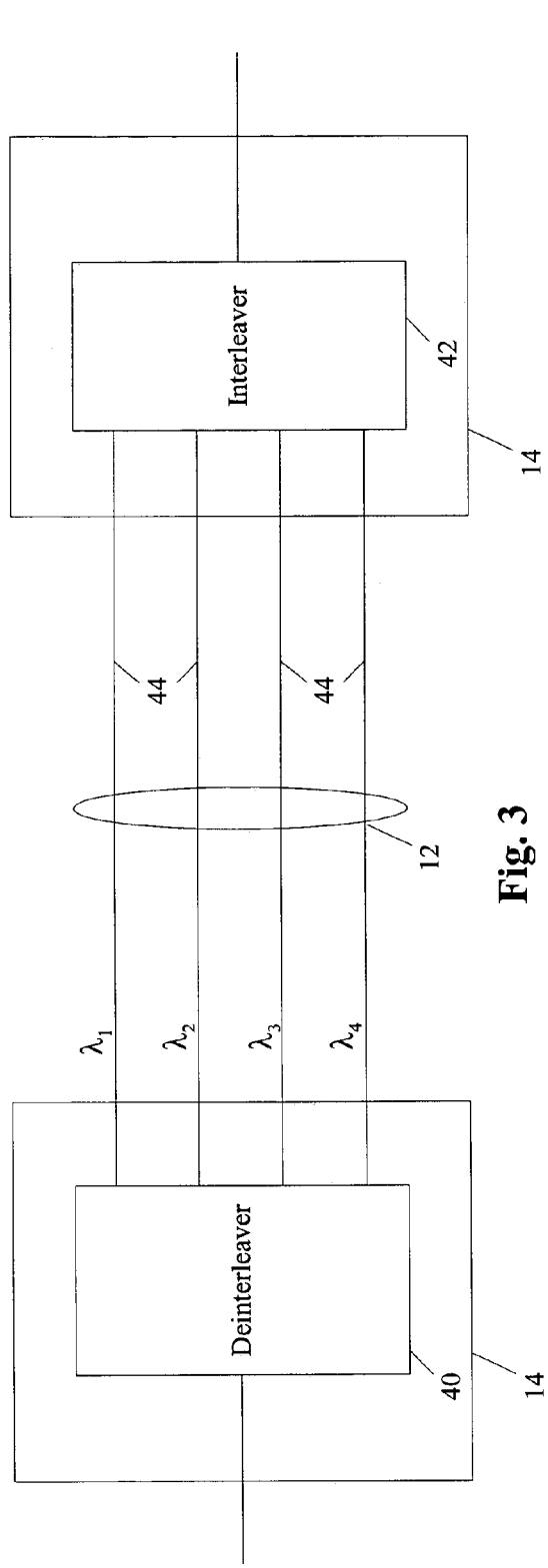
FIG. 3 illustrates an optical communication system according the present invention.

FIG. 3 illustrates an optical communication system 10 according to one embodiment of the present invention. The system 10 has network elements 14 interconnected by an optical pathway 12. The network elements may have a deinterleaver 40 and interleaver 42. The system 10 receives input traffic that is transmitted on the optical pathway 12 on various channels 44 carried on wavelengths $\lambda_1$, $\lambda_2$, $\lambda_3$, and $\lambda_4$ and then exits as output traffic. While not shown in FIG. 3, optical amplifiers 30 may be placed along the optical path 12 as needed to amplify the signals in the optical path 12.

The deinterleaver 40 separates the traffic into several lower rate data signals. Separating the traffic also includes deinterleaving the traffic. The illustrated embodiment includes a one to four deinterleaver 40, although other variants may be used. Typically, each lower data rate signal will have a data rate of the input data rate divided by the number of lower rate signals. Each of these lower data rate signals will be transmitted on a channel 44 along one or more of the optical paths 12. Each channel 44 typically is carried on a specific optical wavelength. The interleaver 42 receives each of the lower data rate signals on the channels 44. The interleaver 42 combines the lower data rate signals back into an input data rate signal and outputs the signal as output traffic.

Figure 4:
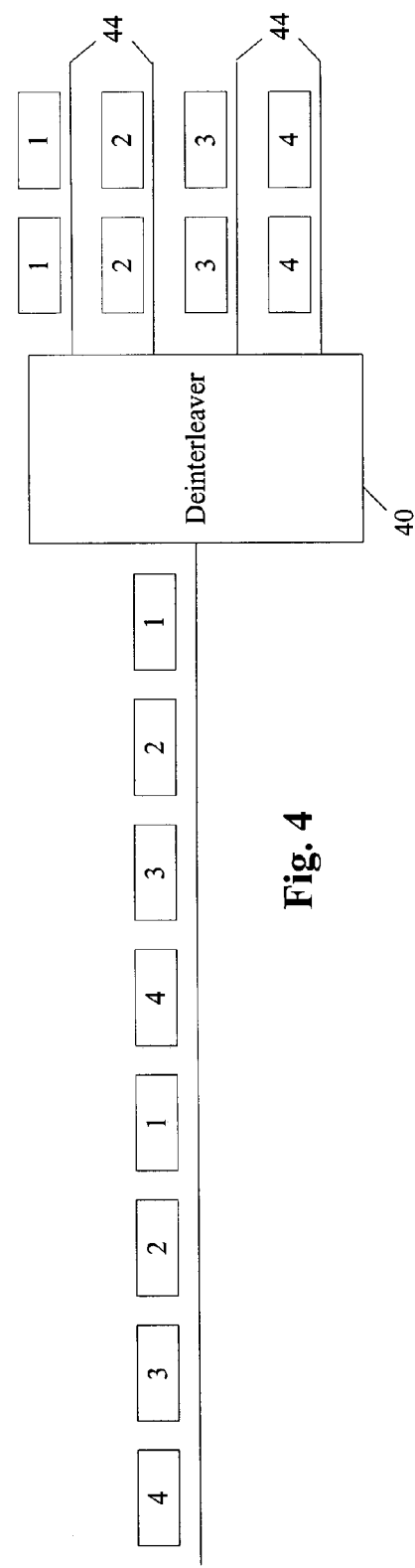
FIG. 4 illustrates the operation of a deinterleaver according to the present invention.

FIG. 4 illustrates the operation of one embodiment of a deinterleaver 40. The deinterleaver 40 receives input traffic and outputs first, second, third, and fourth portions on first, second, third, and fourth channels 44. The portions may be single data bits, single bytes, or some number of bits or bytes depending upon the structure of the data in the input traffic.

FIG. 5 illustrates another embodiment of the deinterleaver 40. The deinterleaver 40 in this embodiment processes the first four portions as described above for the deinterleaver 40 shown in FIG. 4. The deinterleaver 40 places the second set of four portions in the channels 44 in a different order, with input portions 1, 2, 3, and 4 being placed, respectively, on output channels 3, 1, 4, and 2. The order of the second set of portions on the channels 44 may be preselected or may be random. The process continues with the deinterleaver 40 placing the next set of four portions on the channels according to a preselected pattern or randomly.

The deinterleaver 40 may receive the input traffic as either an electrical or an optical signal. The deinterleaver 40 may also convert optical input traffic to electrical signals or electrical input traffic to optical signals for further processing. The input traffic portions may be accordingly separated either optically or electrically. The deinterleaver 40 may output the separated portions as either electrical or optical signals along the channels 44. If the output is electrical, then a transmitter 20 will receive the electrical signal from the deinterleaver 40 and transmit it as an optical signal along the channel 44 in the optical pathway 12. The transmitter 20 may also receive multiple channels 44 and transmit the electrical signals optically using sideband modulation. The deinterleaver 40 may output optical signals at the same wavelength such as used in short reach interfaces. In this case, a transmitter 20 would receive the optical signals and transmit them on a transmission wavelength as described for the electrical output signals. Also, the deinterleaver 40 may incorporate transmitters 20 and output the optical signals on different wavelengths to be transmitted in the system 10. The deinterleaver 40 may also handle M input streams that each are separated into N channels thereby resulting in M·N output channels.

The deinterleaver 40 may also randomly select which channels 44 receive which data signals. For example, with four channels, the deinterleaver 40 could randomly select which of the four channels 44 or wavelengths is to receive each of the data streams. On a periodic basis, the deinterleaver 40 may change the channels 44 that the data streams are transmitted on. Additionally, each deinterleaver 40 may be assigned a fixed set of channels 44 to use, or the deinterleavers 40 may chose any available channel 44 on the optical path 12.

In another embodiment of the present inventions, the size of the portions may vary as a function of time. For example the size of the portions may be selected randomly. This may be done for each portion, or for each channel, i.e., each channel would all have portions of the same size, but the size would be different between channels. Also, the portion size may be set for a period of time and then changed from time to time. A pattern of portion sizes may also be used to set the size of the portions.

FIG. 6 illustrates the operation of an interleaver 42. The interleaver 42 operates in a complementary manner to the deinterleaver 40. The interleaver 42 receives portions from the channels 44. Again, as in the above example, the number of lower data rate signals may be any number greater than two. The interleaver 42 combines the multiple received portions back into the single higher data rate stream that is in the same order as the input traffic received by the deinterleaver 40. The interleaver 42 may also receive portions that have been reordered as illustrated in the deinterleaver 40 embodiment illustrated in FIG. 5. In this case, the interleaver 42 would have to reorder the portions from the channels 44 to place the portions in their proper position in the output traffic stream. If the portions are reordered by the deinterleaver 40 in a known pattern, that pattern must be known by the interleaver 42 in order to combine the portions back into their proper order. This pattern may be a repeating pattern, or may be a randomly generated pattern that is known to both the deinterleaver 40 and the interleaver 42. A repeating pattern of reorderings may be stored in a list. The first item of the list is selected to reorder data, then the next and so on until the end of the list, at which point the reordering starts at the beginning of the list again. If the deinterleaver 40 is using a random ordering, that random ordering must be made known to the interleaver 42 as well. This may be done, for example, by using a random number generator that generates a random set of numbers based upon an input seed. This seed would be known to both the deinterleaver 40 and the interleaver 42 in order for each to create identical random number sequences. An out of band or in band communication channel may also be used to communicate the sequence of the reordered portions. This communication channel may use encryption and authentication to securely communicate the sequence of reordered portions.

An eavesdropper who taps the optical signal in the optical pathway 12 will receive the signals carried by the various channels 44. Each individual channel 44 only contains a portion of the data contained in the original input traffic and therefore the data on a single channel 44 is likely to be of little use to the eavesdropper. In order to reconstruct the original input traffic, the eavesdropper has to know or determine the manner in which the data has been separated into several channels 44. These channels 44 then would have to be recombined in the proper sequence. When the portions in the input traffic are separated as illustrated in FIG. 5, the eavesdropper's ability to properly recreate the input traffic stream is much more difficult.

Additionally, the eavesdropper must now either gain knowledge of how the portions are ordered or try to randomly reorder the portions. It is also possible that the channels 44 for a given input traffic stream are transmitted over different optical pathways 12 through the optical system, and over time these pathways maybe changed as well. This would increase the privacy of the input traffic stream because an eavesdropper now has the added complication of surreptitiously tapping the optical signal out of various optical pathways 12 at different locations and then trying to recombine the data.

Figure 7:
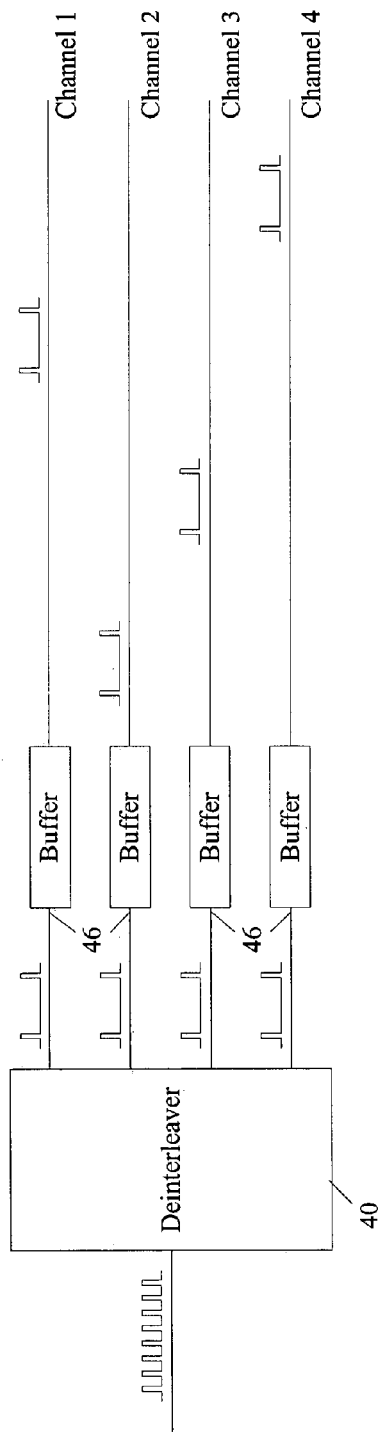
FIG. 7 illustrates a deinterleaver with buffers according to the present invention.

FIG. 7 illustrates a deinterleaver 40 with buffers 46. The deinterleaver 40 operates as described in the embodiments above. The buffers 46 are added at the output of the deinterleaver 40. The buffers 46 delay the data before sending it on the channels 44. Each buffer 46 may be set to introduce a different delay in the data upon each of the channels 44 as shown. For example, channel 4 has the smallest delay and channel 2 the most. Alternatively, rather than having a buffer for each channel, a single buffer may be used to delay the data on all of the channels.

The delays placed on the different channels 44 result in a misalignment in the data. An eavesdropper intercepting the data on the channels 44 may know the data is split among the different channels, but cannot easily synchronize the data. The number of potential combinations of delay increase exponentially with the number of channels per input traffic stream, resulting in greater privacy.

Figure 8:
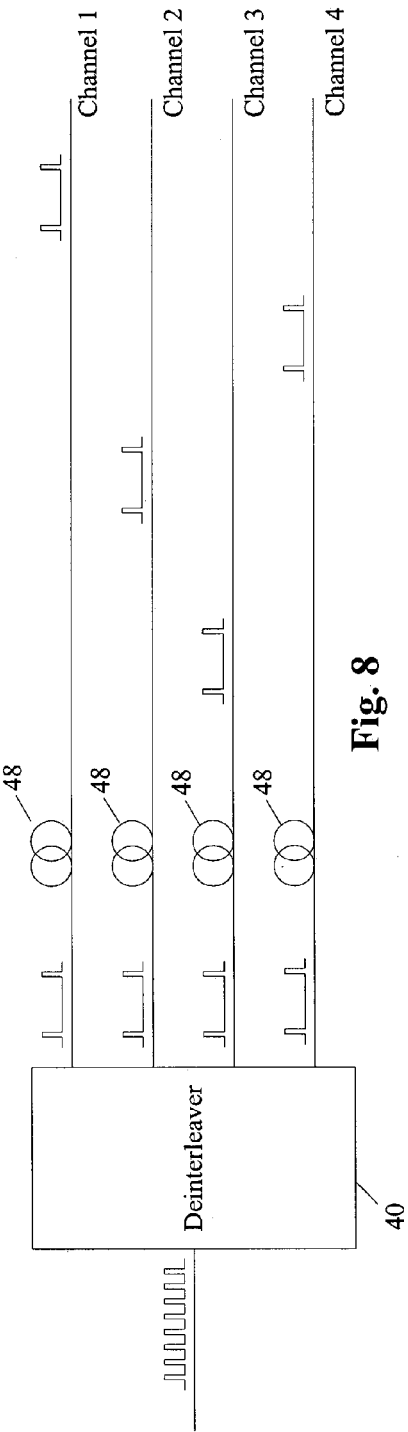
FIG. 8 illustrates the use of fiber coils as optical delay lines that buffer the optical signal when the output of the deinterleaver is optical signals.

FIG. 8 shows the use of fiber coils 48 as optical delay lines that buffer the optical signal when the output of the deinterleaver 40 is optical signals. The fiber coils 48 could be of different length to introduce various delays in the channels 44 as shown. If the deinterleaver 40 outputs electrical signals, then the buffers may be electrical buffers of sufficient depth to introduce the desired time delays. Also, fiber coils 48 may be used to introduce delays beyond the electrical buffering capability.

FIG. 9 illustrates an interleaver 42 and buffers 46 for use with signals that are delayed. The interleaver 42 operates as previously described. The buffers 46 receive the data on the channels 44 and introduce delays to counter the delays introduced by the buffer 46 associated with the deinterleaver 40. The buffer 46 on the fourth channel introduces the largest delay and the buffer on the second channel introduces the smallest delay in order to realign the information carried on the channels 44.

FIG. 10 illustrates an interleaver 42 with fiber coils 48 for delaying the optical signals on channels 44. The lengths of the fiber coils 48 are selected to compensate for the delay introduced by the fiber coils 48 associated with the deinterleaver 40 resulting in the data on the channels 44 being aligned at the fiber coil 48 outputs.

While introducing different delays into each of the channels makes intercepting and reconstructing the data more difficult, if the delays introduced on each channel vary as a function of time, the eavesdropper will have to continuously be trying to realign the data. If the delay characteristics change more quickly than the eavesdropper can successfully reconstruct the input traffic stream, then the eavesdropper will have difficulty reconstructing the complete stream in real time. Furthermore, the eavesdropper may only be able to reconstruct small segments of the traffic stream during later processing due to the storage capacity requirements for capturing data from a large capacity or commercial communications system.

If the buffers 46 are electrical buffers, then there is great flexibility in the ability to vary the delay on each channel within the storage capacity of the buffer. The buffers 46 can be commanded to switch the delays on each channel 44 at any time. The delays may be selected based upon a known sequence of delay values that is known to the deinterleaver and interleaver buffers 46. The delay values may also be generated randomly in a manner similar to that as described above for the portion reordering.

Dispersion of the signals as they propagate along the optical path causes time delays between the different channels 44. The buffers 46 may be used to introduce an additional delay to compensate for dispersion.

FIGS. 11-13 illustrate various embodiments of apparatuses for varying the delay of an optical signal. FIG. 11 has a 1×M switch 24 that receives a single input signal that can be switched to any of M outputs. Each output of the switch 24 connects to a different length of fiber coil 48. Each of the fiber coils 48 connects to a multiplexer 34 the outputs the delayed signal. The length of delay in the optical signal is controlled by selecting the switch output.

FIG. 12 illustrates another embodiment for varying the delay of an optical signal that includes a 1×2 switch 24, a fiber coil 48, a short length of fiber 12, and a multiplexer 34. The 1×2 switch 24 receives the optical signal to be delayed. One output of the 1×2 switch 24 connects to the length of fiber coil 48. The other output of the switch 24 connects to the short length of fiber 12. The fiber coil 48 and short length of fiber 12 connect to the multiplexer 34 that outputs a delayed signal. Addition delay may be added by adding additional segments as shown in FIG. 12. The number of segments and the lengths of the fiber coils determines how many different delays may be achieved. Various values of delay can be achieved by controlling the 1×2 switch in each segment.

FIG. 13 illustrates another embodiment for varying the delay of an optical signal including an N×M switch 24, various lengths of fiber coils 48, and a M×N switch 24. The N×M switch 24 receives N input optical signals to be delayed. The value of M will be equal to or greater than N to allow all of the incoming signals to pass through. The switch switches the N input signals to different outputs of the switch 24. Each of the M outputs of the switch 24 connects to one of the M fiber coils 48. The fiber coils 48 delay each of the N optical signals. The M inputs of the M×N switch 24 connect to the M fiber coils 48. The M×N switches the M inputs to the N outputs of the switch 24 so that the delayed optical signals are on the output fiber 12 corresponding to its input fiber 12. The delay added to each optical signal is determined by controlling the N×M and M×N switches 24.

As an example of the difficulty that an eavesdropper would have in realigning the data, assume a system with an input stream separated into four data signals. Assume that the data signal frame length is $6.25 \times 10^5$. With four data signals there are 24 possible combinations of channels leading to $24 \times (6.25 \times 10^5)^3$ or $\sim 10^{18}$ potential combinations that the eavesdropper would have to consider in order to find the correct realignment.

FIG. 14 illustrates another embodiment of a communication system 10. This embodiment includes nodes 14 including an FEC encoder 50, a deinterleaver 40, channels 44, an interleaver 42, and an FEC decoder 52. This embodiment adds an FEC encoder 50 and FEC decoder 52 to the embodiment of FIG. 3. The FEC encoder 50 encodes the input traffic. The deinterleaver 40 receives and separates the encoded traffic as described above. The interleaver 42 combines the separated encoded traffic. The FEC decoder 52 receives and decodes the combined encoded traffic. In one embodiment, the FEC encoding is chosen in such a way that any attempt to FEC decode an isolated data signal will exceed the error correcting capacity of the code and will create severe errors rendering the data signal unreadable.

An eavesdropper who intercepts the channels 44 containing the separated encoded data, will have a more difficult time reconstructing the original data. Many errors would result if an eavesdropper uses an FEC decoder 52 on any of the single channels. The FEC encoder 50 and decoder 52 may be programmable, in that they may be controlled to use different codes. The FEC encoding could be changed in a pattern or randomly as previously described in relation to the reordering of portions. In addition, the FEC encoded data may be punctured, i.e., removing certain bits, or coset coded in a known or random pattern as long as the decoder knows how to decode the encoded data. Additionally, some FEC encoders process blocks of traffic data. This processed data is then read out. The order of reading out that data can be varied to further make it difficult for an eavesdropper to reconstruct the traffic. If an eavesdropper attempts to add data to the data signals, if the number of bits added is small the FEC will be able to correct for the changed bits. If it is greater than what the FEC can correct, then the FEC detects severe errors, and a protection switch may be initiated, and an intrusion may be indicated.

In another embodiment of the present invention, an encoder may be used to FEC encode, reorder, deinterleave, and buffer the input data stream. Also, the encoder may perform any combination of some these functions. Likewise, a decoder may be used to FEC decode, reorder, interleave, and buffer the data carried on the channels 44 or any combination of these function. Also, the decoder may perform any combination of some these functions. The encoder and decoder may be implemented, for example, as software operating in a CPU, as an application specific integrated circuit (ASIC), or in a programmable signal processor.

FIG. 15 is another embodiment of the present invention. FIG. 15 adds buffers 40 to the embodiment of FIG. 14. This system may vary both the FEC encoding and channel delays. Also the portions may be reordered as previously described.

An eavesdropper may attempt to identify frame alignment bits. Frame alignment bits are used for example in the SONET/SDH protocols. FEC encoding also places frame alignment bits in the encoded data. The frame alignment bits may be coded or randomly selected. Also, false patterns of bits may be transmitted to confuse the eavesdropper. The use of these schemes will have to be known throughout the system in order to transmit the traffic.

The present invention includes parameter encoding to reduce the probability that an eavesdropper may intercept the traffic in an optical network. Transmitting traffic using various techniques with parameters that can be varied is parameter encoding. The variability and unknown structure of the traffic as it is transmitted throughout he optical network due to parameter encoding makes it more difficult for an eavesdropper to intercept and use the traffic.

A network management system ("NMS") may be used control the parameter encoding of the system. This would include control of the operating parameters of the system, such as the reordering of portions, channel delay, and FEC variations. The NMS may set the operating parameters of the system to be valid only for a certain time period. This would prevent an eavesdropper from attempting to change the operating parameters. Such an unauthorized attempt to change the operating parameters could be detected. The NMS would coordinate the parameter encoding throughout the system to assure that the traffic properly passes through the system. Also, the NMS may use secure communication techniques, such as encryption and verification, to coordinate the changing operating parameters throughout the system in order to prevent an eavesdropper from intercepting the operating parameters or changing the operating parameters. The control of the system parameters may also be accomplished by individual nodes or hardware in the network.

If a verification technique is used in controlling the system parameters, an intruder may be detected and located. Once an intruder is detected, the delays in the verification messages may be monitored. The delays may be used to identify the location of the intruder in the network.

Many variations and modifications can be made to described embodiments of the invention without departing from the scope of the invention. For example, advantages of the present invention can be realized with different numbers and configurations of the deinterleaved channels 44. Also, sending the deinterleaved channels 44 along different optical paths 12 provides additional privacy protection. Other variations, modifications, and combinations are taught and suggested by the present invention, and it is intended that the foregoing specification and the following claims cover such variations, modifications, and combinations.

The invention claimed is:

1. A method for transmitting traffic in an optical communication system comprising:
   deinterleaving input traffic into a plurality of data signals;
   transmitting each of the data streams on a separate channel;
   inserting a known time shift between at least two of the data signals;
   receiving the data signals;
   compensating for the time shift between the data signals; and
   interleaving the data signals from the channels into output traffic corresponding to the input traffic.

2. The method of claim 1, wherein compensating for the time shift includes compensating for the known time shift and compensating for chromatic dispersion between channels.

3. The method of claim 1, wherein inserting includes inserting a known time shift between at least two of the data streams after transmitting each of the data signals on a separate channel.

4. The method of claim 1, wherein inserting includes inserting a known time shift between at least two of the data signals after deinterleaving and before transmitting.

5. The method of claim 1, wherein the known time shift is randomly selected.

6. The method of claim 1, wherein the known time shift is selected from a list of shift values and wherein a different set of shift values is selected from the list over time.

7. A method for transmitting traffic in an optical communication system comprising:
   separating the input traffic into a plurality of portions;
   separating the input traffic into an additional plurality of portions;
   assigning the plurality of portions in a first order to a plurality of data signals;
   assigning the plurality of additional portions in a second order to the plurality of data signals;
   transmitting each of the data signals on a separate channel;
   receiving the data signals on the channels;
   combining the plurality of portions into output traffic corresponding to the input traffic; and
   combining the plurality of additional portions into output traffic corresponding to the input traffic.

8. The method of claim 7, wherein the first and second orders are randomly selected.

9. The method of claim 7, wherein the first order and second order is selected from a list of orders.

10. The method of claim 7, wherein the size of the portions is randomly selected.

11. The method of claim 7, further including FEC encoding the input traffic.

12. The method of claim 11, wherein the parameters of the EC encoding vary over time.

13. The method of claim 11, further including inserting a known time shift between at least two of the data signals.

\* \* \* \* \*

UNITED STATES PATENT AND TRADEMARK OFFICE
CERTIFICATE OF CORRECTION

| | | |
|---|---|---|
| PATENT NO. | : 7,437,082 B1 | Page 1 of 1 |
| APPLICATION NO. | : 10/618996 | |
| DATED | : October 14, 2008 | |
| INVENTOR(S) | : David F. Smith | |

It is certified that error appears in the above-identified patent and that said Letters Patent is hereby corrected as shown below:

Column 14, Claim 12, ln 47, delete "EC" and insert -- FEC --

Signed and Sealed this

Twelfth Day of January, 2010

David J. Kappos
*Director of the United States Patent and Trademark Office*